(12) United States Patent
Kruiswyk et al.

(10) Patent No.: US 12,725,819 B2
(45) Date of Patent: Sep. 1, 2026

(54) FUEL CELL CHARGE AIR SYSTEM AND METHOD

(71) Applicant: Caterpillar Inc., Peoria, IL (US)

(72) Inventors: Richard William Kruiswyk, Dunlap, IL (US); Christopher Dean Lusardi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 778 days.

(21) Appl. No.: 18/122,176

(22) Filed: Mar. 16, 2023

(65) Prior Publication Data

US 2024/0313244 A1 Sep. 19, 2024

(51) Int. Cl.
*H01M 8/04746* (2016.01)
*H01M 8/04111* (2016.01)

(52) U.S. Cl.
CPC ... *H01M 8/04761* (2013.01); *H01M 8/04776* (2013.01); *H01M 8/04111* (2013.01)

(58) Field of Classification Search
CPC ......... H01M 8/04111; H01M 8/04761; H01M 8/04776
See application file for complete search history.

(56) References Cited

U.S. PATENT DOCUMENTS 3,064,947 A * 11/1962 Wynne .................. F28D 7/0058 165/149
11,207,800 B2 * 12/2021 Naumann ............... B29C 33/36
11,217,800 B2 * 1/2022 Mori ................... H01M 8/0494
2004/0151964 A1 8/2004 Daimlerchrysler
2007/0072021 A1 * 3/2007 Taniguchi ............. F16C 17/024 429/408
2010/0159360 A1 6/2010 Daimler
2012/0328968 A1 * 12/2012 Honda .............. H01M 8/04761 429/444
2015/0285191 A1 10/2015 Kitada
2019/0074527 A1 3/2019 Suzuki et al.
2021/0028470 A1 1/2021 Mori et al.
2022/0344683 A1 10/2022 Cummins

FOREIGN PATENT DOCUMENTS

WO 2008049444 A1 5/2008
WO 2009056636 A1 5/2009
WO 2013045052 A2 4/2013

OTHER PUBLICATIONS

Written Opinion and International Search Report for Int'l. Patent Appln. No. PCT/US2023/084155, mailed Apr. 5, 2024 (12 pgs).

* cited by examiner

*Primary Examiner* — Lorne E Meade

(57) ABSTRACT

A fuel cell electric power system includes a fuel cell stack, and a charge air system including an intake air compressor, an exhaust turbine, and a flow control valve assembly. The flow control valve assembly includes at least one flow control valve rotatable in a valve housing to fluidly connect an exhaust inlet, selectively, to a turbine feed outlet via a variable flow area to adjust a torque applied to the exhaust turbine by a flow of exhaust.

18 Claims, 2 Drawing Sheets

FUEL CELL CHARGE AIR SYSTEM AND METHOD

STATEMENT OF GOVERNMENT INTEREST

This invention was made with government support under contract DE-EE0009620 awarded by Department of Energy. The Government has certain rights in this invention.

TECHNICAL FIELD

The present disclosure relates generally to a fuel cell electric power system, and more particularly to a flow control valve selectively operable to vary a flow of exhaust from a fuel cell to a turbine rotatably coupled to an intake air compressor for a fuel cell.

BACKGROUND

Fuel cells are in widespread use throughout the world for electric power generation. While many different designs have been proposed over the years, fuel cells all generally produce power via the controlled chemical reaction of a fuel and an oxidant, typically air, to generate an electric current. Fuel cells offer the promise of reduced or substantially zero emissions of certain compounds, notably so-called greenhouse gases.

As fuel cell applications have expanded in recent years from relatively small-scale lower power uses to higher power applications such as supplying electric power grids and operating heavy machinery, it has become apparent that traditional fuel cell system designs may be inadequate to provide an optimum range of power output. For example, it may be desirable for a fuel cell in a power generation or vehicular application to provide very low or no power output, at times, but quickly respond to larger power demands at other times. Widely varying power output demand can necessitate sophisticated apparatus for rapidly and reliably adjusting a flow of the fuel and oxidant reactants to a fuel cell.

Variable pumps, compressors, and other equipment can be used in some instances to provide flexibility in pressures and flow rates to satisfy varying load demands. Existing technology nevertheless often falls short of providing an optimum power range, typically toward upper or lower extremes. International patent application publication WO 2013/045052 to Fabian et al. proposes an electric turbocharger for influencing pressure and/or volume flow apparently in an effort to allow adjustment to the compressed intake air feed to a fuel cell. The art provides ample room for improvements and development of alternative strategies.

SUMMARY OF THE INVENTION

In one aspect, an electric power system includes a fuel cell system having a fuel cell stack, an intake air conduit extending to the fuel cell stack, and an exhaust conduit extending from the fuel cell stack. The electric power system further includes a charge air system having an intake air compressor, an exhaust turbine, and a flow control valve assembly. The flow control valve assembly includes a housing forming an exhaust inlet fluidly connected to the exhaust conduit, and a turbine feed outlet, and at least one flow control valve exposed to a flow of exhaust from the exhaust inlet. The at least one flow control valve is rotatable in the housing to fluidly connect the exhaust inlet, selectively, to the exhaust turbine via an unrestricted flow area, or to the exhaust turbine via a restricted flow area.

In another aspect, a method of operating a fuel cell electric power system includes feeding exhaust from a fuel cell stack through an exhaust passage to a turbine, and operating a compressor to pressurize intake air supplying the fuel cell stack based on a torque applied to the turbine via a flow of the exhaust. The method further includes varying a geometry of the exhaust passage via rotating a flow control valve, and operating the compressor to pressurize intake air supplying the fuel cell stack based on an adjusted torque applied to the turbine via a flow of the exhaust after varying the geometry of the exhaust passage.

In still another aspect, a charge air system for a fuel cell electric power system includes an intake air conduit, and an exhaust conduit forming an exhaust passage, and having a unitary exhaust inlet configured to receive a flow of exhaust from a fuel cell stack, and a turbine feed outlet. The charge air system further includes a turbine positioned for impingement by the flow of exhaust conveyed through the turbine feed outlet, and a compressor coupled to the turbine and positioned at least partially within the intake air conduit to pressurize intake air for the fuel cell stack. The charge air system still further includes an exhaust-impinged surface positioned within the exhaust conduit, and rotatable to vary a geometry of the exhaust passage, and an actuator for varying at least one of a position or an orientation of the flow control valve.

DETAILED DESCRIPTION

Figures 1, 2, 3, 4:
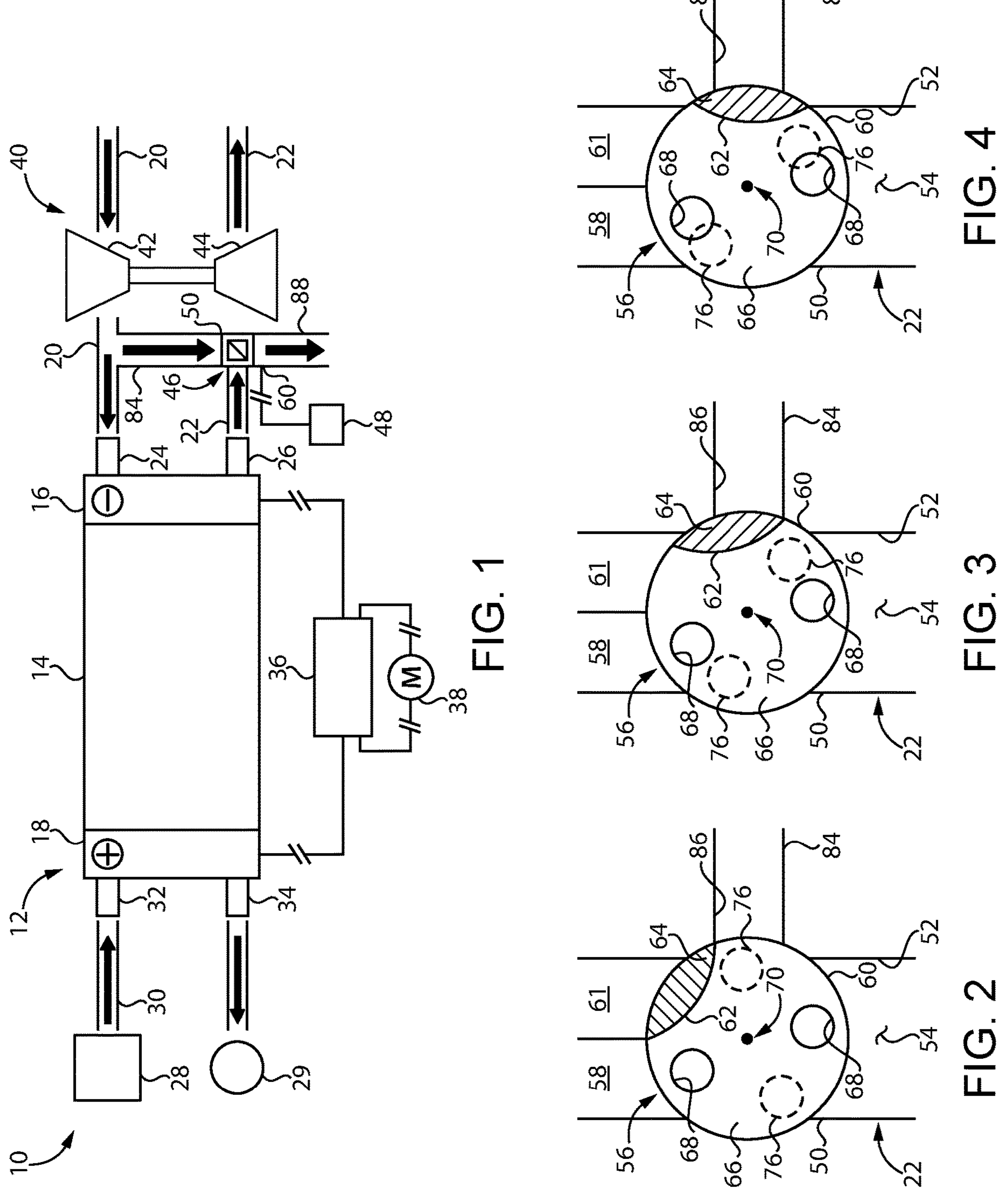
FIG. 1 is a diagrammatic view of a fuel cell electric power system, according to one embodiment.
FIG. 2 is a diagrammatic view of portions of a charge air system for a fuel cell electric power system, in a first configuration.
FIG. 3 is a diagrammatic view of portions of the charge air system in a second configuration.
FIG. 4 is a diagrammatic view of portions of the charge air system in a third configuration.

Referring to FIG. 1, there is shown an electric power system 10 according to one embodiment, and including a fuel cell system 12. Fuel cell system 12 includes a fuel cell stack 14, a cathode or cathode chamber 16, and an anode or anode chamber 18. Fuel cell system 12 also includes an intake air conduit 20 extending to fuel cell stack 14, and an exhaust conduit 22 extending from fuel cell stack 14. Fuel cell stack 14 can include any type or number of fuel cell(s) including one or more solid oxide fuel cells, one or more proton exchange membrane fuel cells, or still another. An inlet 24 is provided to cathode chamber 16 and receives a flow of pressurized intake air or another suitable oxidant from intake air conduit 20. An outlet 26 from cathode chamber 16 receives a flow of "exhaust" and feeds the same to exhaust conduit 22. Those skilled in the art will be familiar with fuel cell designs providing an inflow of gases containing oxidant which feeds a cathode, and an outflow of gases from which at least some of the oxidant has been consumed that is expelled as exhaust.

Fuel cell system 12 also includes a fuel supply 28, and a fuel supply conduit 30 extending to an inlet 32 feeding a flow of fuel to anode chamber 18. An outlet 34 from anode chamber 18 feeds a flow of gases from which at least some of the fuel has been consumed to processing equipment 29, such as a condenser. An inverter 36 may also be electrically connected to fuel cell stack 14 to provide electric power for operating a load 38 such as an electric motor.

It should be appreciated that electric power system 10, and fuel cell system 12 in particular, is not limited with regard to the types of reactants and any suitable oxidant, typically oxygen in ambient air, and any suitable fuel such as hydrogen or a gaseous hydrocarbon fuel such as natural gas, may be used. As will be further apparent from the following description electric power system 10 is uniquely configured for operating efficiently at a relatively wide electric power output range. Electric power could be produced for operating an electric motor as shown but could additionally or alternatively be used for operating other types of electrically powered machinery, feeding an electric power grid, or charging a battery to name a few examples.

Electric power system 10 further includes a charge air system 40. Charge air system 40 includes an intake air compressor 42, an exhaust turbine 44 positioned for impingement by a flow of exhaust from or through exhaust conduit 22, and a flow control valve assembly 46. Compressor 42 is coupled to turbine 44 and positioned at least partially in intake air conduit 20 to pressurized intake air for fuel cell stack 14. Flow control valve assembly 46 includes a housing 50 and is operably to affect the flow and/or pressure of exhaust impinging on exhaust turbine 44 to vary a torque the exhaust applies to exhaust turbine 44. A varied torque on exhaust turbine 44 can in turn vary a speed of intake air compressor 42 and therefore vary pressurization of intake air fed through intake air conduit 20. Intake air conduit 20 may be equipped with a charge air cooler in some embodiments. Compressor 42 might also be equipped with an electric assist motor in some embodiments.

As can also be seen From FIG. 1, a compressor bypass conduit 46 84 may extend from intake air conduit 20 to flow control valve assembly 46. A wasting outlet conduit 88 may extend from flow control valve assembly 46. In an implementation, wasting outlet conduit 88 bypasses exhaust turbine 44 and returns exhaust to exhaust conduit 22 at a location downstream of turbine 44, although the present disclosure is not thereby limited.

Referring also now to FIG. 2, housing 50 forms an exhaust inlet 52 fluidly connected to or part of exhaust conduit 22. Exhaust inlet 52 may be a unitary exhaust inlet meaning a total of one exhaust inlet that receives 100% of the exhaust from fuel cell stack 14. Exhaust conduit 22 may form an exhaust passage 54. Housing 50 may also form a turbine feed outlet 56. Turbine feed outlet 56 may be an inlet to a turbine housing of exhaust turbine 44 in some embodiments. In a practical implementation, turbine feed outlet 56 includes a divided turbine feed outlet having a first side 58 and a second side 61. It should be appreciated that housing 50 may include a valve housing positioned at a location fluidly between exhaust turbine 44 and outlet 26, thus upstream of exhaust turbine 44. Put differently, exhaust turbine 44 may be located outside of and downstream of housing 50. In other implementations housing 50 could include a turbine housing of exhaust turbine 44 itself.

Flow control valve assembly 46 further includes at least one flow control valve 60 including an exhaust-impinged surface 62 and exposed to a flow of exhaust from exhaust inlet 52. The at least one flow control valve 60 and exhaust-impinged surface 62 may be rotatable in housing 50 to fluidly connect exhaust inlet 52, selectively, to exhaust turbine 44 via an unrestricted flow area, or to exhaust turbine 44 via a restricted flow area. Example details and significance of the fluid connection via an unrestricted flow area versus a restricted flow area are further discussed herein. As noted, exhaust-impinged surface 62 may be rotatable to vary the relative flow area from exhaust inlet 52 to exhaust turbine 44. Rotating exhaust-impinged surface 62 in this manner may be understood to vary a geometry of exhaust passage 54. Charge air system 40 may also include an actuator, further discussed herein, for varying at least one of a position or an orientation of exhaust-impinged surface 62 to thereby vary the geometry of exhaust passage 54.

Housing 50 may further form a wasting outlet 68, fluidly connected to wasting outlet conduit 88. The at least one flow control valve 60 may be rotatable in housing 50 to fluidly connect exhaust inlet 52, selectively, to wasting outlet 68. As also noted above, charge air system 40 may also include a compressor bypass conduit 84. A compressor bypass inlet 86 formed by housing 50 may fluidly connect to compressor bypass conduit 84.

It will be recalled flow control valve 60 is at least one flow control valve. Embodiments are contemplated where multiple flow control valves are positioned fluidly between outlet 26 and turbine 44, including in exhaust conduit 22 or integrated into a turbine housing, that can each be adjusted in position or orientation to vary geometry of exhaust passage 54 in furtherance of the purposes of the present disclosure. A flow control valve means a valve in the common sense of the term, not a vane or a wall, for example. In the illustrated embodiment, the at least one flow control valve 60 includes a single flow control valve 60, meaning a total of one flow control valve, rotatable in housing 50 about an axis 70. The at least one flow control valve, hereinafter referred to for convenience in the singular, fluidly connects exhaust inlet 52, respectively, to exhaust turbine 44 via the unrestricted flow area, to exhaust turbine 44 via the restricted flow area, or to wasting outlet 68, at a first, a second, and a third angular orientation about axis 70. Flow control valve 60 may fluidly connect compressor bypass inlet 86 to turbine feed outlet 56 at the second angular orientation about axis 70. In the described embodiment, flow control valve 60 is rotatable in exhaust conduit 22 to at least three different angular orientations about axis 70, and defines a different fluid flow pattern through exhaust conduit 22 at each of the at least three different angular orientations about axis 70. In other embodiments of the present disclosure, a flow control valve might be rotated to more than three different angular orientations, or less than three different angular orientations, each of which defines a different fluid flow pattern through an exhaust conduit.

FIG. 2 illustrates flow control valve 60 as it might appear where exhaust inlet 52 is fluidly connected to exhaust turbine 44 via a restricted flow area of turbine feed outlet 56, where first side 58 is open to receive a flow of exhaust though exhaust passage 54 but second side 61 is blocked. Thus, in the FIG. 2 illustration all of the exhaust flow is caused to flow through only first side 58, applying greater torque to exhaust turbine 44 than what would typically occur if both first side 58 and second side 61 were open. This arrangement can in turn cause compressor 42 to rotate at a relatively greater speed than what would otherwise be expected. It can also be seen that wasting outlet 68 includes two wasting outlets or holes 68. In the view of FIG. 2 wasting outlets 68 may include holes formed in housing 50 with flow control valve 60 (behind housing 50 in the FIG. 2 illustration) rotated to selectively connect exhaust inlet 52 to wasting outlet(s) 68 as desired. Additional holes 76 formed in flow control valve 60 itself are not in fluid communication with wasting outlets 68 in the FIG. 2 illustration.

Referring also now to FIG. 3, there is shown flow control valve 60 having been rotated about axis 70 from the angular orientation shown in FIG. 2 to a different angular orientation, where exhaust inlet 52 is fluidly connected to exhaust turbine 44 via an unrestricted flow area of turbine feed outlet 56, feeding exhaust to both of first side 58 and second side 61 of turbine feed outlet 56. FIG. 2 can be understood to show flow control valve 60 at a second angular orientation about axis 70, FIG. 3 can be understood to show flow control valve 60 at a first angular orientation about axis 70, and FIG. 4 can be understood to show flow control valve at a third angular orientation about axis 70. The terms "first," "second," and "third" are used here merely for convenience and ease of description.

Focusing further on FIG. 4, there is shown flow control valve 60 having been rotated further about axis 70 to the third angular orientation. In FIG. 4 it can be seen that holes 76 in flow control valve 60 fluidly connect to wasting outlets 68. It will further be recalled flow control valve 60 includes exhaust-impinged surface 62. Exhaust-impinged surface 62 may include a surface of a converger 64. Converger 64 may be part of flow control valve 60 and causes, based upon its angular orientation about axis 70, exhaust flow from exhaust inlet 52 to converge to one of first side 58 or second side 61, or not converge, depending upon the present angular orientation about axis 70. Converger 64 may also interact with compressor bypass inlet 86. In FIG. 2 compressor bypass inlet 86 fluidly connects through housing 50 to first side 58 but not to second side 61. In FIG. 3 converger 64 blocks compressor bypass inlet 86. In FIG. 4 converger 64 also blocks compressor bypass inlet 86. Those skilled in the art will appreciate that a relative size or angular extent of converger 64 about axis 70 can determine at which angular orientation(s) of flow control valve 60 about axis 70 the various fluid connections are established or blocked.

Figure 5:
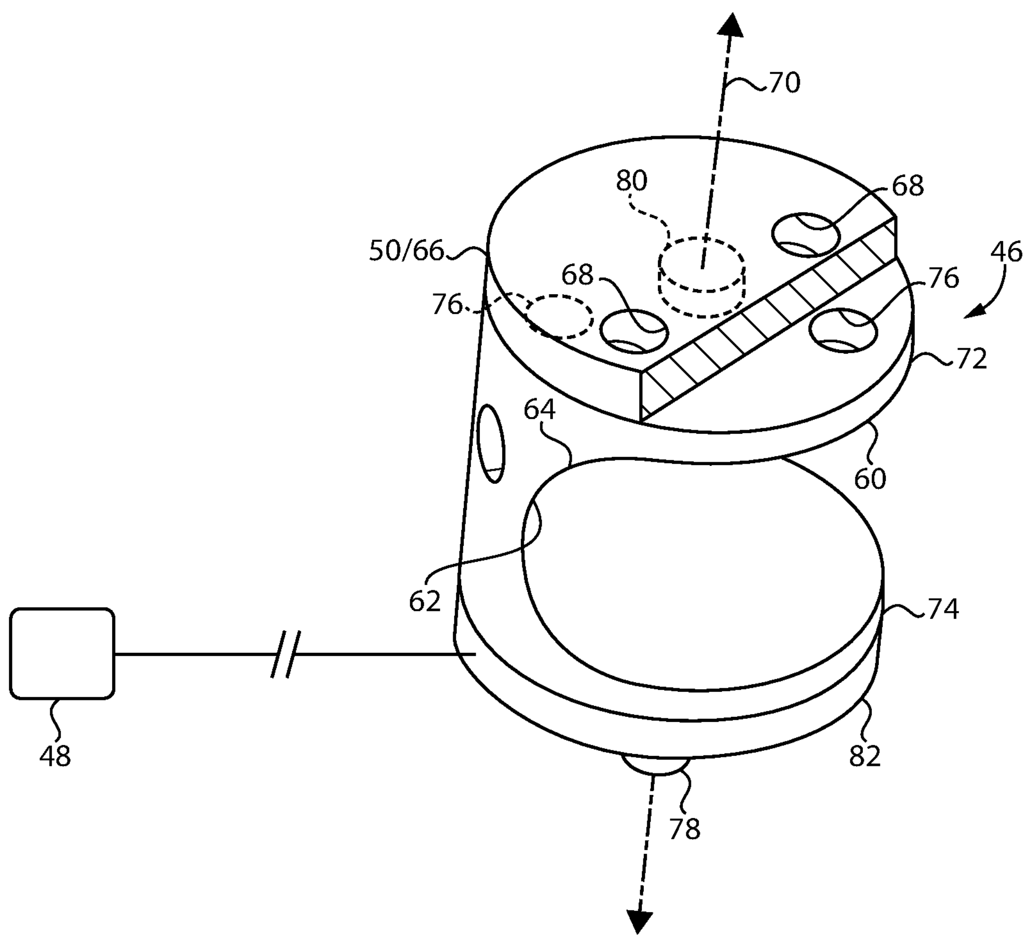
FIG. 5 is a diagrammatic view of a flow control valve assembly, according to one embodiment.

Referring also now to FIG. 5, there are shown additional features of flow control valve assembly 46. Flow control valve assembly 46 may include an electrical actuator 82 coupled to flow control valve 60. Electrical actuator 82 can include any suitable electrical actuator such as a threaded or splined screw actuator, a stepper motor, or still another type of suitable electrical actuator. An electronic control unit 48 is also shown in FIGS. 1 and 5 and electrically connects to, energizes, and controls electrical actuator 82.

Flow control valve 60 may also include a first stub shaft or the like 78 and a second stub shaft or the like 80 that support flow control valve 60 for rotation in housing 50. In the illustrated embodiment, flow control valve 60 further includes a first end disc 72 and a second end disc 74. Converger 64 may extend part circumferentially about axis 70 and axially between first end disc 72 and second end disc 74, and may fill a portion of a cylindrical volume defined between first end disc 72 and second end disc 74. First end disc 72 may include a first set of holes 76 therein. Housing 50 may include a valve plate 66 or other housing structure wherein wasting outlet(s) 68 are formed. Wasting outlet(s) 68 include a second set of holes positioned to fluidly connect with the first set of holes 76, such as at the third angular orientation about axis 70 as depicted in FIG. 4.

INDUSTRIAL APPLICABILITY

Referring to the drawings generally, operating a fuel cell electric power system according to the present disclosure may include feeding exhaust from a fuel cell stack through an exhaust passage to an exhaust turbine, and operating a compressor to pressurize intake air supplying the fuel cell stack based on a torque applied to the turbine via the flow of the exhaust. Operating a fuel cell electric power system can also include varying a geometry of the exhaust passage including, for example, varying a geometry of an exhaust passage according to the strategies discussed herein via a rotation of a flow control valve. The compressor may be operated to pressurize intake air supplying the fuel cell stack based on an adjusted torque applied to the turbine via a flow of the exhaust after varying the geometry of the exhaust passage.

In one example application, varying a geometry of exhaust passage 54 may include varying a flow area of the exhaust passage by opening or blocking one of two sides of divided turbine feed outlet 56. For example, flow control valve 60 might be rotated from the angular orientation shown in FIG. 2 to the angular orientation shown in FIG. 3, or the reverse. Going from FIG. 2 to FIG. 3 would thus include transitioning flow control valve 60 from an angular orientation blocking one of two sides of divided turbine feed outlet 56 to an angular orientation where neither of the two sides is blocked. Pressurized intake air from compressor 42 is fed into exhaust passage 54 while the one of the two sides 58 and 61 is blocked, but in this example is not fed into exhaust passage 54 when both sides are open. In another example, going from the configuration of FIG. 3 to FIG. 4 would include opening one of the two sides 58 and 61 such that both sides are open, and wasting exhaust through wasting outlets 68 from exhaust passage 54.

The configuration shown in FIG. 2 could be a low power configuration, where compressor bypass is used, one side of turbine inlet 56 is blocked and no wasting occurs. At lower power output demand on electric power system 10 the FIG. 2 configuration might be used to ensure sufficient boost. The arrangement shown in FIG. 3 can be a medium power arrangement where no compressor bypass is used, converger 64 is not used and no wasting is employed. In FIG. 4 flow control valve 60 may be in a high power configuration where no compressor bypass is used, converger 64 is not used, and wasting outlet(s) 68 are open. The FIG. 4 arrangement might be used where power output demand on electric power system 10 is high and it is desirable to not boost too much.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An electric power system comprising:

a fuel cell system including a fuel cell stack, an intake air conduit extending to the fuel cell stack, and an exhaust conduit extending from the fuel cell stack;

a charge air system including an intake air compressor, an exhaust turbine, and a flow control valve assembly;

the flow control valve assembly including a housing forming an exhaust inlet fluidly connected to the exhaust conduit, and a turbine feed outlet, a compressor bypass inlet, a wasting outlet, and at least one flow control valve exposed to a flow of exhaust from the exhaust inlet; and the at least one flow control valve is rotatable in the housing to fluidly connect the exhaust inlet, selectively, to the exhaust turbine via an unrestricted flow area, or to the exhaust turbine via a restricted flow area, to fluidly connect, selectively, the compressor bypass inlet to the turbine feed outlet via the restricted flow area, and to fluidly connect, selectively, the exhaust inlet to the wasting outlet.

2. The electric power system of claim 1 wherein the at least one flow control valve includes a single flow control valve rotatable in the valve housing about an axis, to fluidly connect the exhaust inlet, respectively, to the exhaust turbine via the unrestricted flow area, to the exhaust turbine via the restricted flow area, or to the wasting outlet, at a first, a second, and a third angular orientation about the axis.

3. The electric power system of claim 2 wherein the flow control valve fluidly connects the compressor bypass inlet to the turbine feed outlet at the second angular orientation about the axis.

4. The electric power system of claim 2 wherein the turbine feed outlet includes a divided turbine feed outlet.

5. The electric power system of claim 4 wherein the flow control valve includes a converger positioned to block one side of the divided turbine feed outlet at the second angular orientation about the axis.

6. The electric power system of claim 5 wherein:

the converger extends part circumferentially about the axis, and axially between a first end disc and a second end disc of the single flow control valve;

the converger fills a portion of a cylindrical volume defined between the first end disc and the second end disc;

the first end disc includes a first set of holes formed therein; and the flow control valve assembly further includes a valve plate having a second set of holes formed therein, and positioned to fluidly connect with the first set of holes at the third angular orientation about the axis.

7. The electric power system of claim 1 wherein the exhaust turbine is located outside of and downstream of the housing.

8. A method of operating a fuel cell electric power system comprising:

feeding exhaust from a fuel cell stack through an exhaust passage to a turbine feed outlet having a flow area adjustable between a restricted flow area and an unrestricted flow area;

operating a compressor to pressurize intake air supplying the fuel cell stack based on a torque applied to the turbine via a flow of the exhaust;

varying a geometry of the exhaust passage via rotating a flow control valve; and operating the compressor to pressurize intake air supplying the fuel cell stack based on an adjusted torque applied to the turbine via a flow of the exhaust after varying the geometry of the exhaust passage; and varying a flow of pressurized air bypassed from the compressor into the turbine feed outlet based on the varying the geometry of the exhaust passage via the rotating the flow control valve.

9. The method of claim 8 wherein the varying a geometry of the exhaust passage includes varying the flow area of the exhaust passage to the turbine.

10. The method of claim 8 wherein the varying a geometry of the exhaust passage includes rotating a single flow control valve within the exhaust passage.

11. The method of claim 10 further comprising opening or blocking one of two sides of a divided turbine feed outlet based on the rotating a single flow control valve within the exhaust passage.

12. The method of claim 11 wherein the opening or blocking one of two sides of a divided turbine feed outlet includes blocking the one of two sides, and further comprising feeding the pressurized intake air from the compressor into the exhaust passage while the one of the two sides is blocked.

13. The method of claim 12 wherein the opening or blocking one of two sides of a divided turbine feed outlet includes opening the one of two sides such that both of the sides are open, and further comprising wasting exhaust through a wasting outlet from the exhaust passage.

14. A charge air system for a fuel cell electric power system comprising:

an intake air conduit;

an exhaust conduit forming an exhaust passage, and having a unitary exhaust inlet configured to receive a flow of exhaust from a fuel cell stack, and a turbine feed outlet;

a turbine positioned for impingement by the flow of exhaust conveyed through the turbine feed outlet;

a compressor coupled to the turbine and positioned at least partially within the intake air conduit to pressurize intake air for the fuel cell stack;

a flow control valve including an exhaust-impinged surface positioned within the exhaust conduit, and rotatable to vary a geometry of the exhaust passage; and an actuator for varying at least one of a position or an orientation of the flow control valve;

wherein the flow control valve is rotatable in the exhaust conduit to at least three different angular orientations about an axis, and defines a different fluid flow pattern through the exhaust conduit at each of the at least three different angular orientations about the axis;

wherein the exhaust conduit includes a housing forming the unitary exhaust inlet, and the turbine feed outlet includes a divided turbine feed outlet; and wherein the housing forms a compressor bypass inlet, and a wasting outlet.

15. The charge air system of claim 14 wherein the flow control valve includes a first end disc, a second end disc, and a converger extending axially between the first end disc and the second end disc and having the exhaust-impinged surface formed thereon.

16. The charge air system of claim 15 wherein the first end disc includes a first set of exhaust holes formed therein, and further comprising a valve plate having a second set of exhaust holes formed therein, and the second set of exhaust holes are positioned to fluidly connect with the first set of exhaust holes at one of the at least three angular orientations about the axis.

17. A charge air system for a fuel cell electric power system comprising:

an intake air conduit;

an exhaust conduit forming an exhaust passage, and having a unitary exhaust inlet configured to receive a flow of exhaust from a fuel cell stack, and a turbine feed outlet;

a turbine positioned for impingement by the flow of exhaust conveyed through the turbine feed outlet;

a compressor coupled to the turbine and positioned at least partially within the intake air conduit to pressurize intake air for the fuel cell stack;

a flow control valve including an exhaust-impinged surface positioned within the exhaust conduit, and rotatable to vary a geometry of the exhaust passage; and an actuator for varying at least one of a position or an orientation of the flow control valve;

wherein the flow control valve is rotatable in the exhaust conduit to at least three different angular orientations about an axis, and defines a different fluid flow pattern through the exhaust conduit at each of the at least three different angular orientations about the axis; and wherein the flow control valve includes a first end disc, a second end disc, and a converger extending axially between the first end disc and the second end disc and having the exhaust-impinged surface formed thereon.

18. The charge air system of claim 17 wherein the first end disc includes a first set of exhaust holes formed therein, and further comprising a valve plate having a second set of exhaust holes formed therein, and the second set of exhaust holes are positioned to fluidly connect with the first set of exhaust holes at one of the at least three angular orientations about the axis.

* * * * *